Oct. 3, 1944.   W. M. SCHWEICKART ET AL   2,359,445
STOKER
Original Filed Aug. 28, 1937   12 Sheets-Sheet 1

INVENTORS
William M. Schweickart
Fred T. Julyan
BY Edwards, Bower & Pool
ATTORNEYS

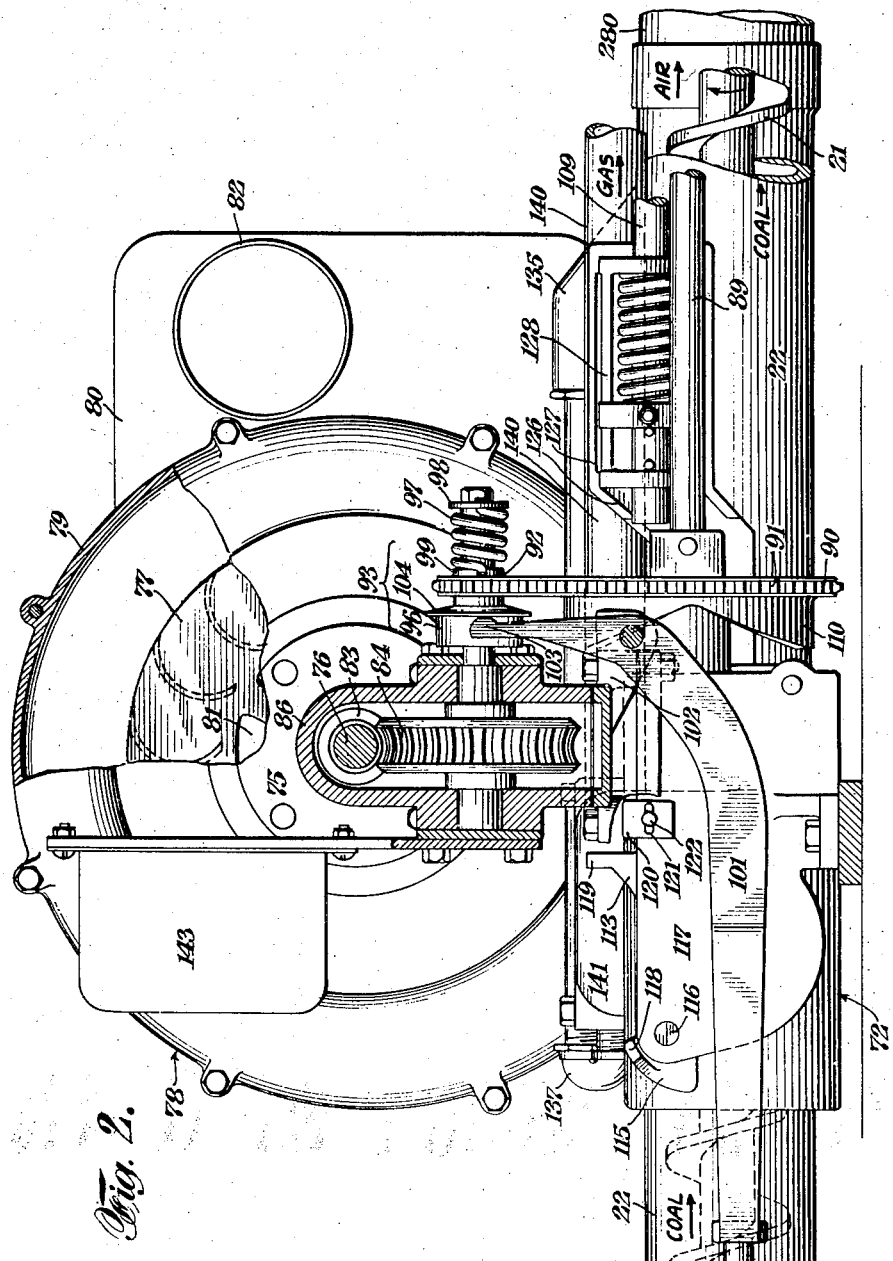

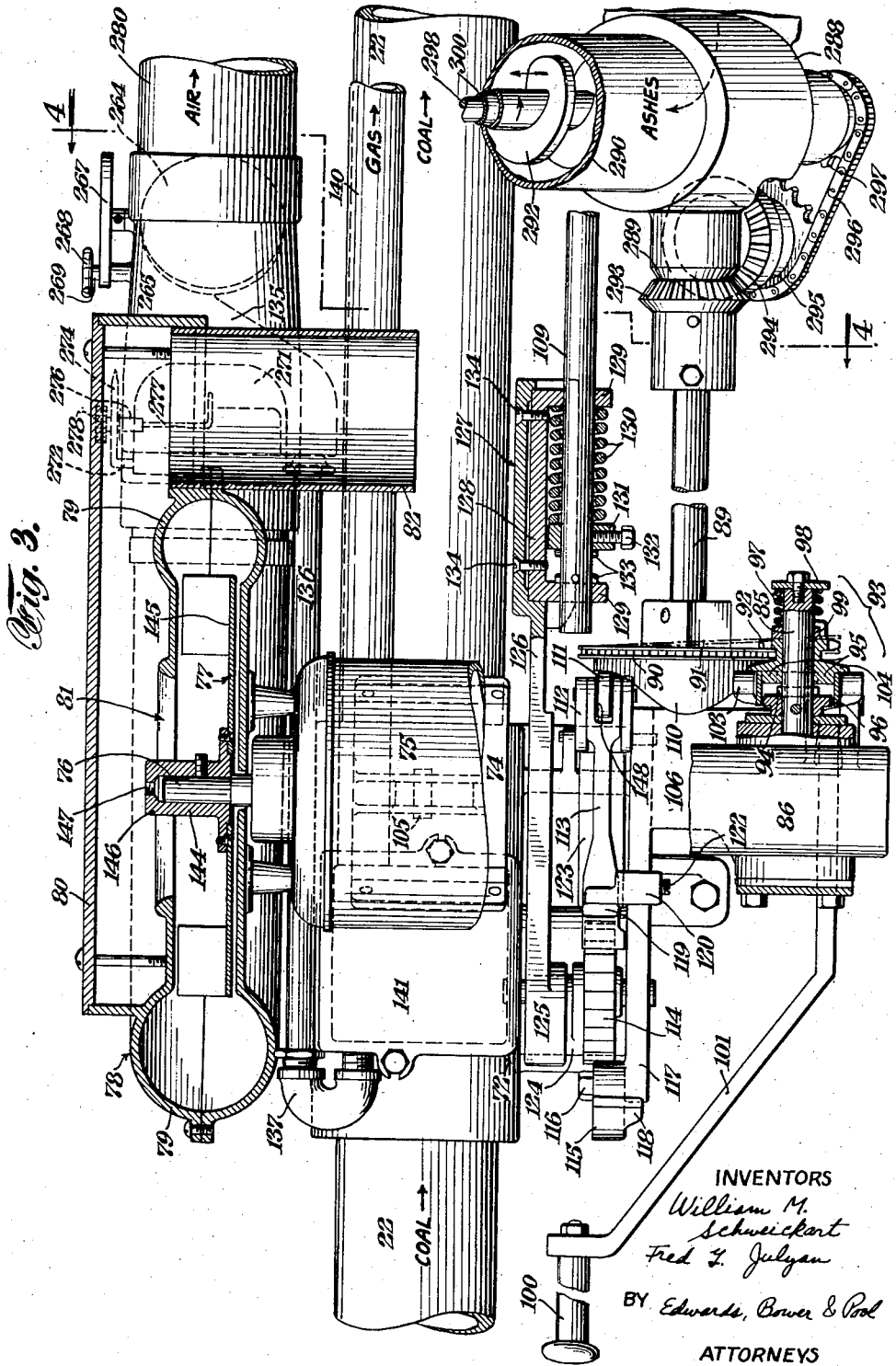

Oct. 3, 1944. W. M. SCHWEICKART ET AL 2,359,445
STOKER
Original Filed Aug. 28, 1937 12 Sheets-Sheet 4
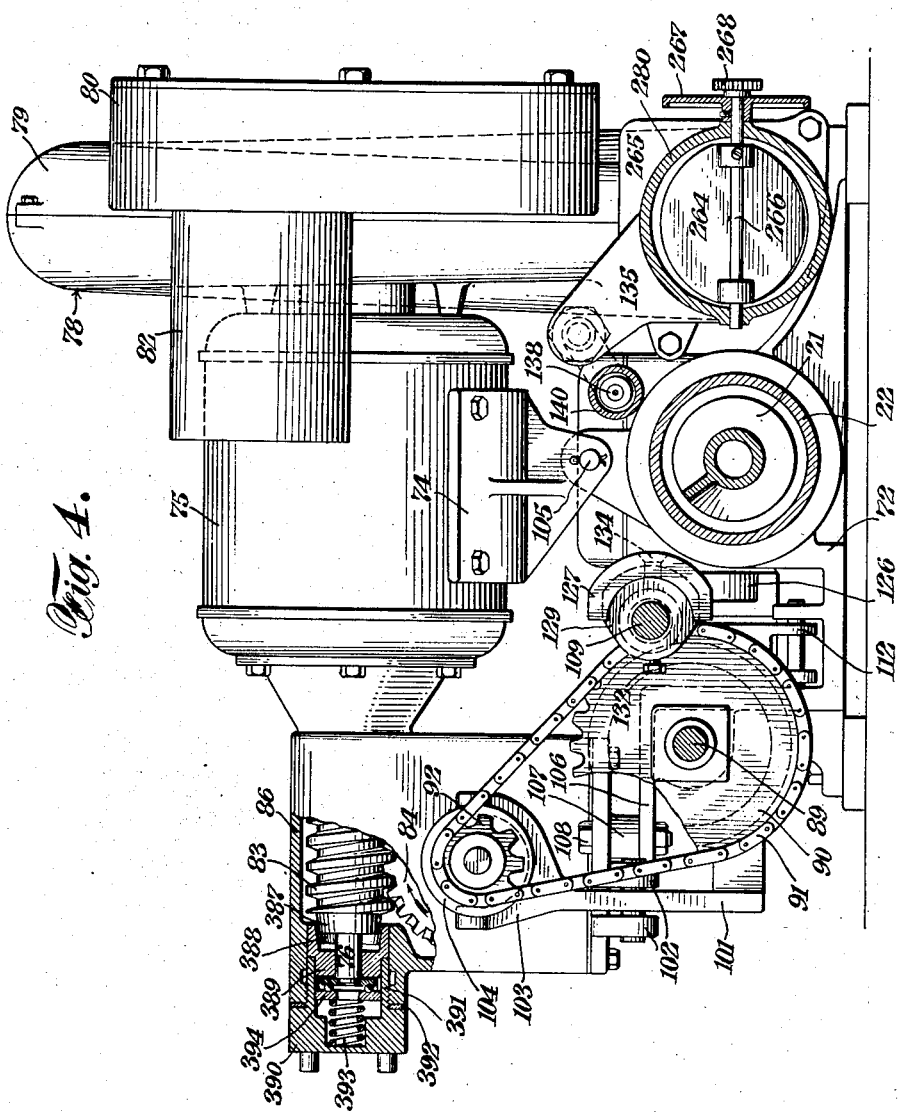
INVENTORS
William M. Schweickart
Fred G. Julyan
BY Edwards, Bower & Pool
ATTORNEYS

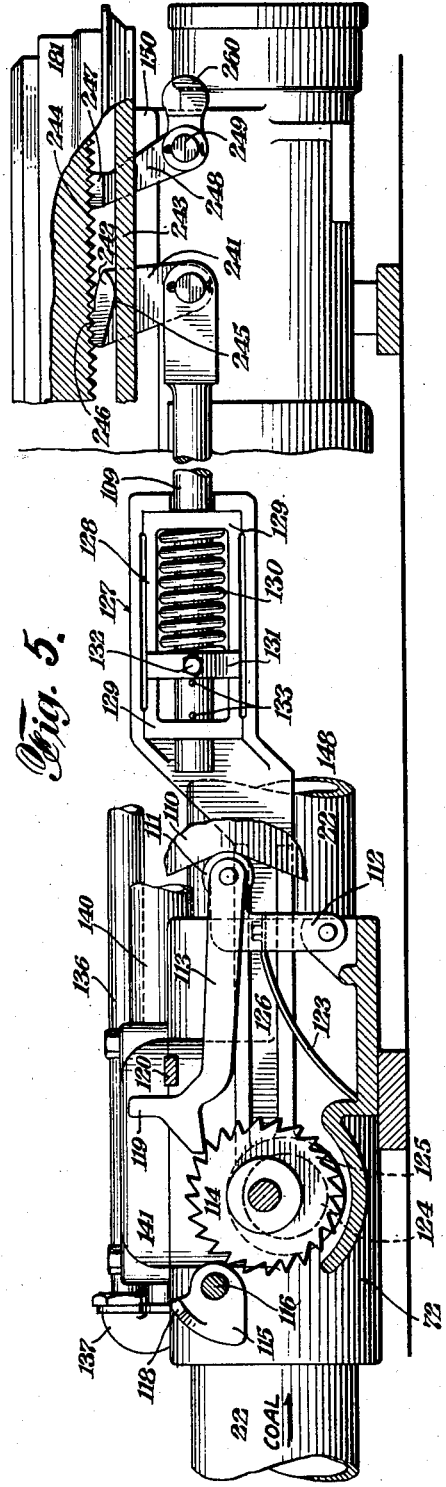
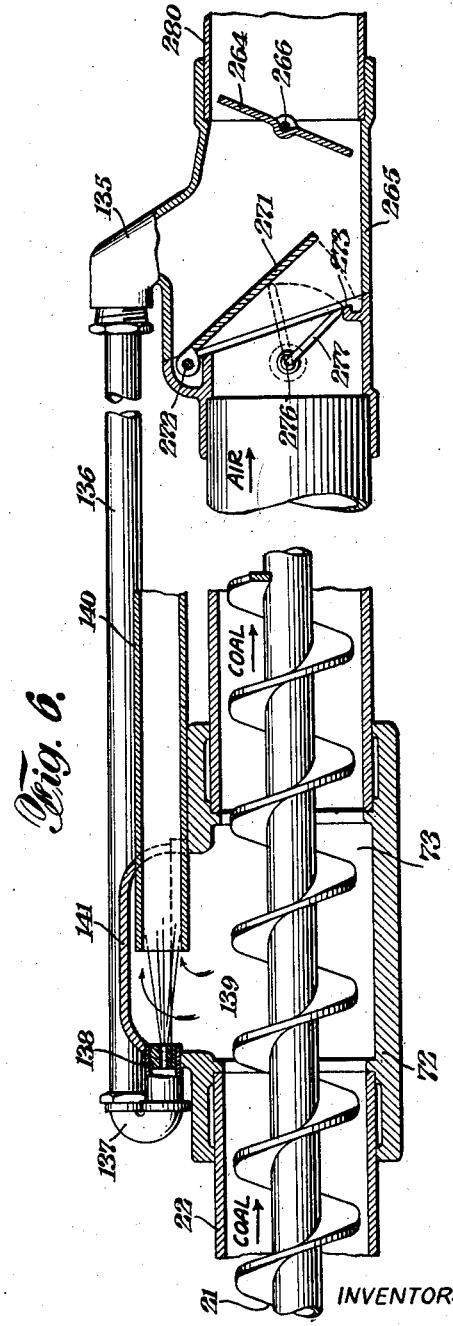

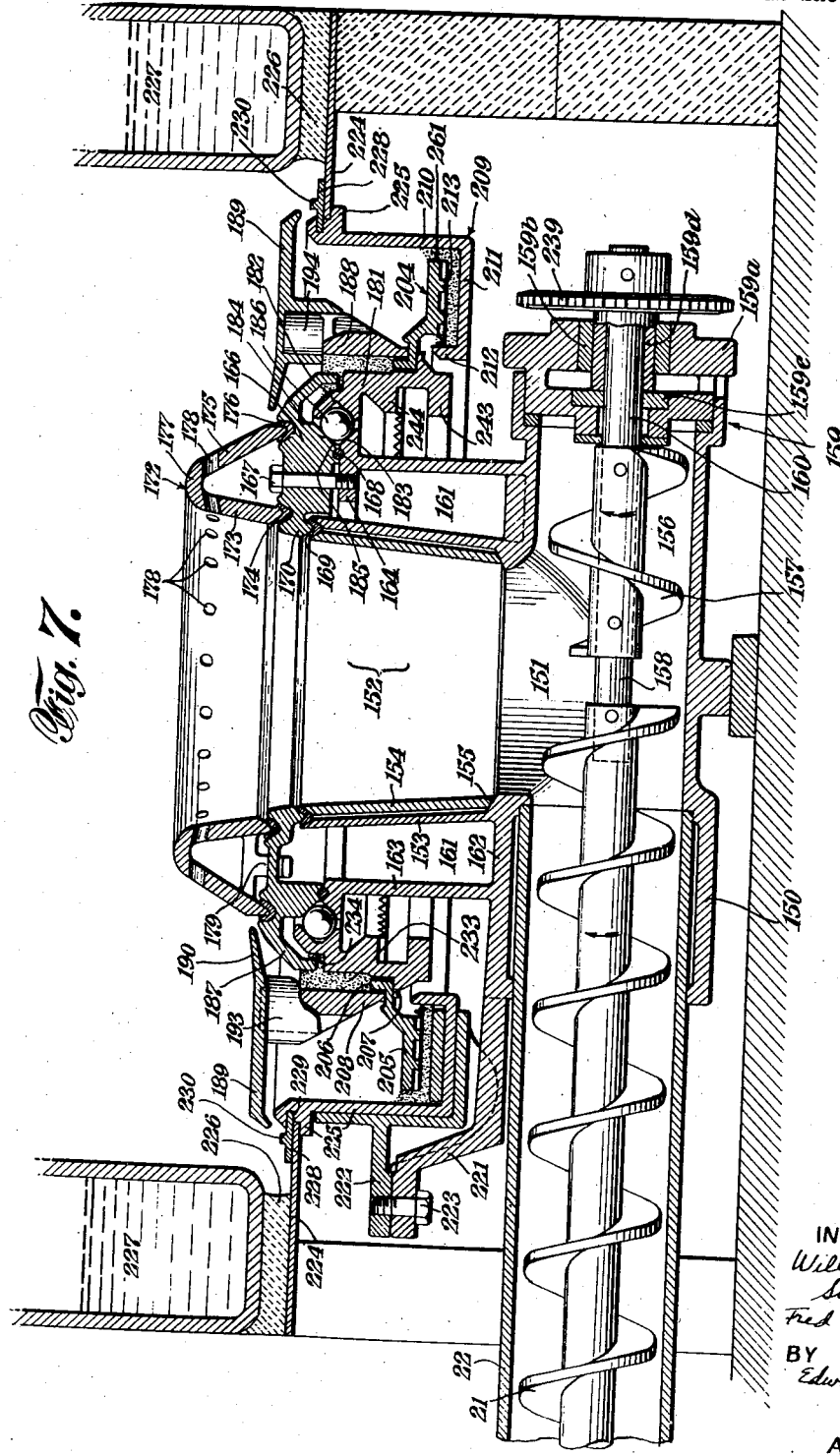

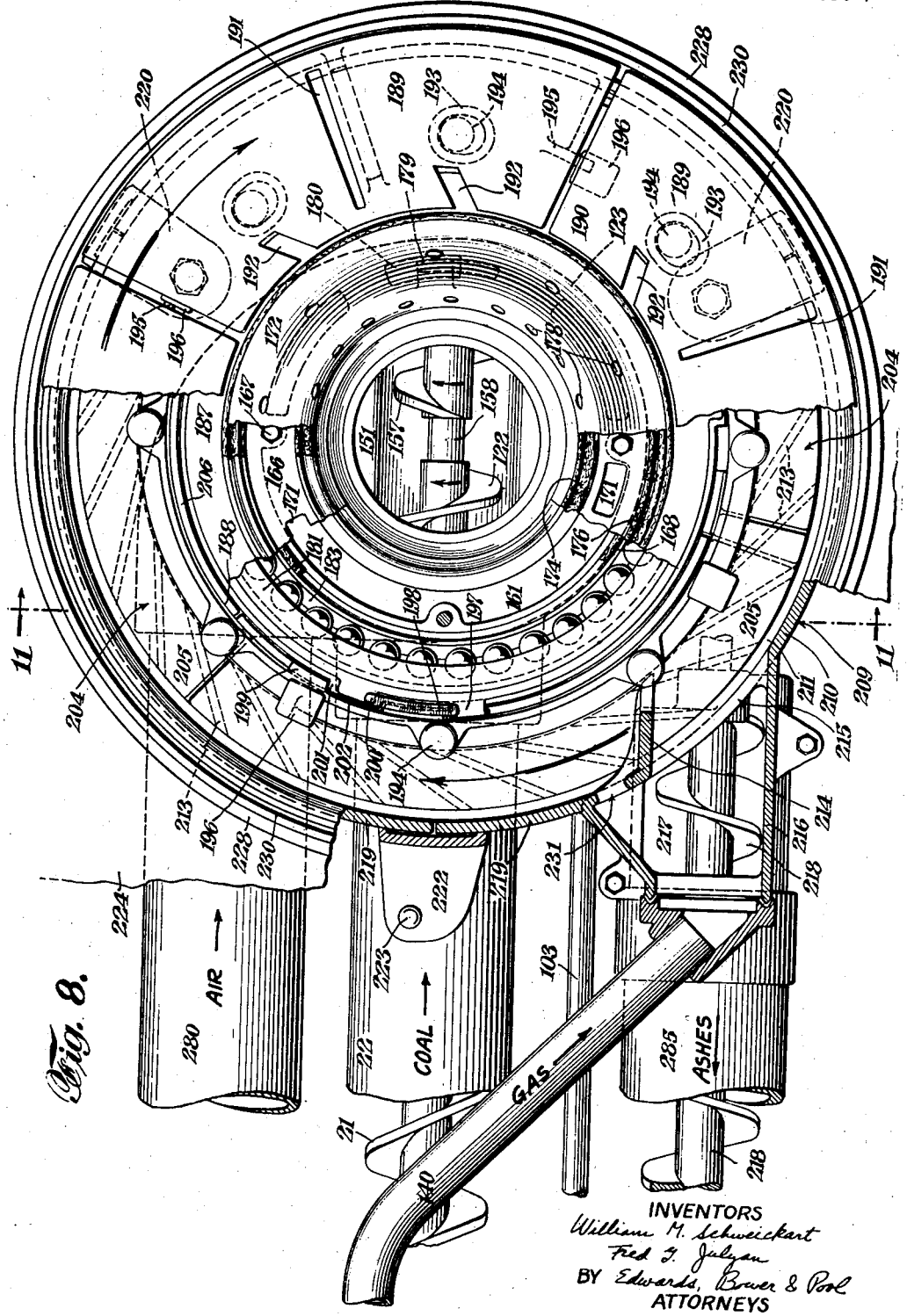

Oct. 3, 1944.　　W. M. SCHWEICKART ET AL　　2,359,445
STOKER
Original Filed Aug. 28, 1937　　12 Sheets-Sheet 8
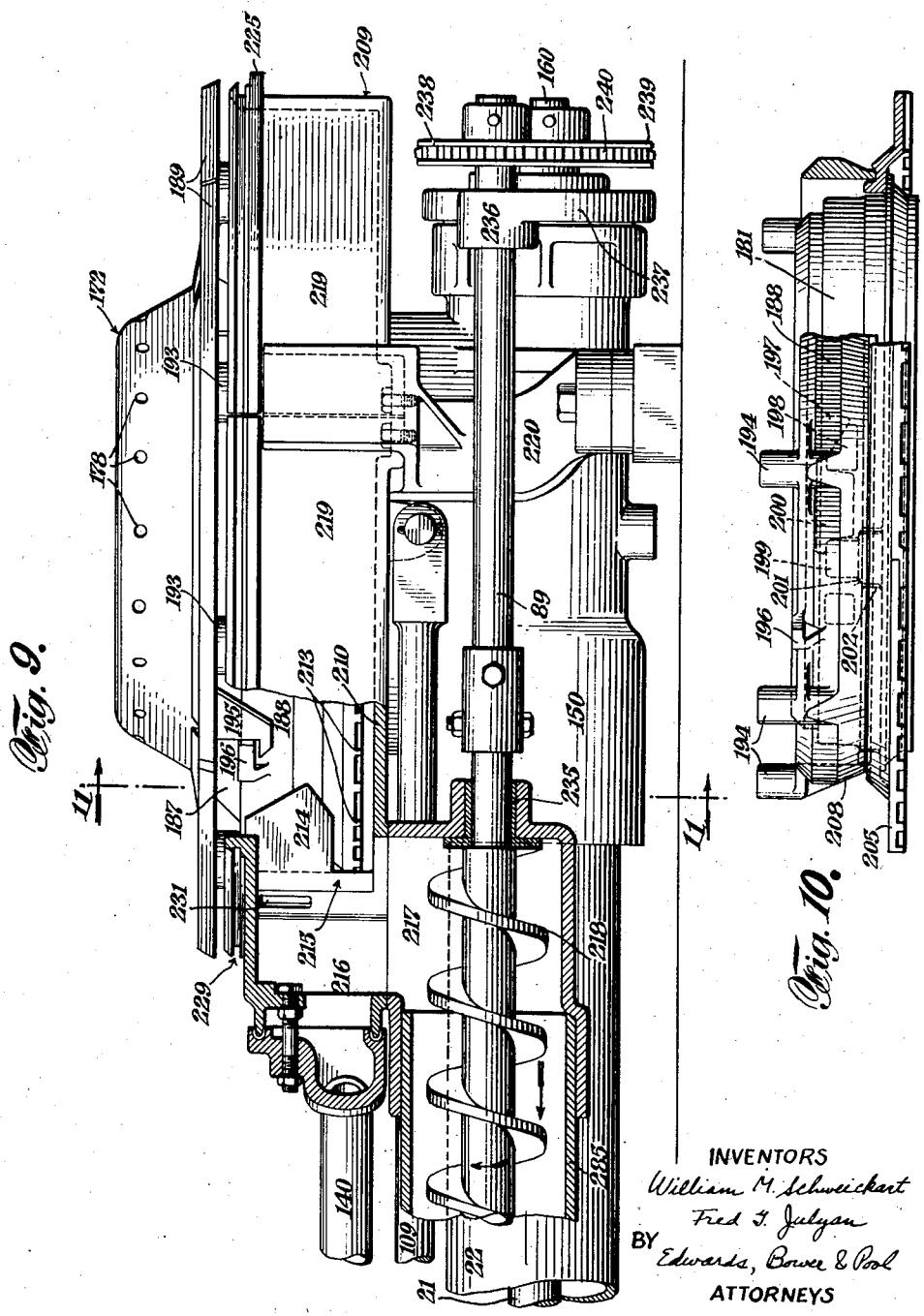
INVENTORS
William M. Schweickart
Fred F. Julyan
BY Edwards, Bower & Pool
ATTORNEYS Oct. 3, 1944.  W. M. SCHWEICKART ET AL  2,359,445
STOKER
Original Filed Aug. 28, 1937  12 Sheets-Sheet 9

INVENTORS
William M. Schweickart
Fred F. Julyan
BY Edwards, Bower & Pool
ATTORNEYS

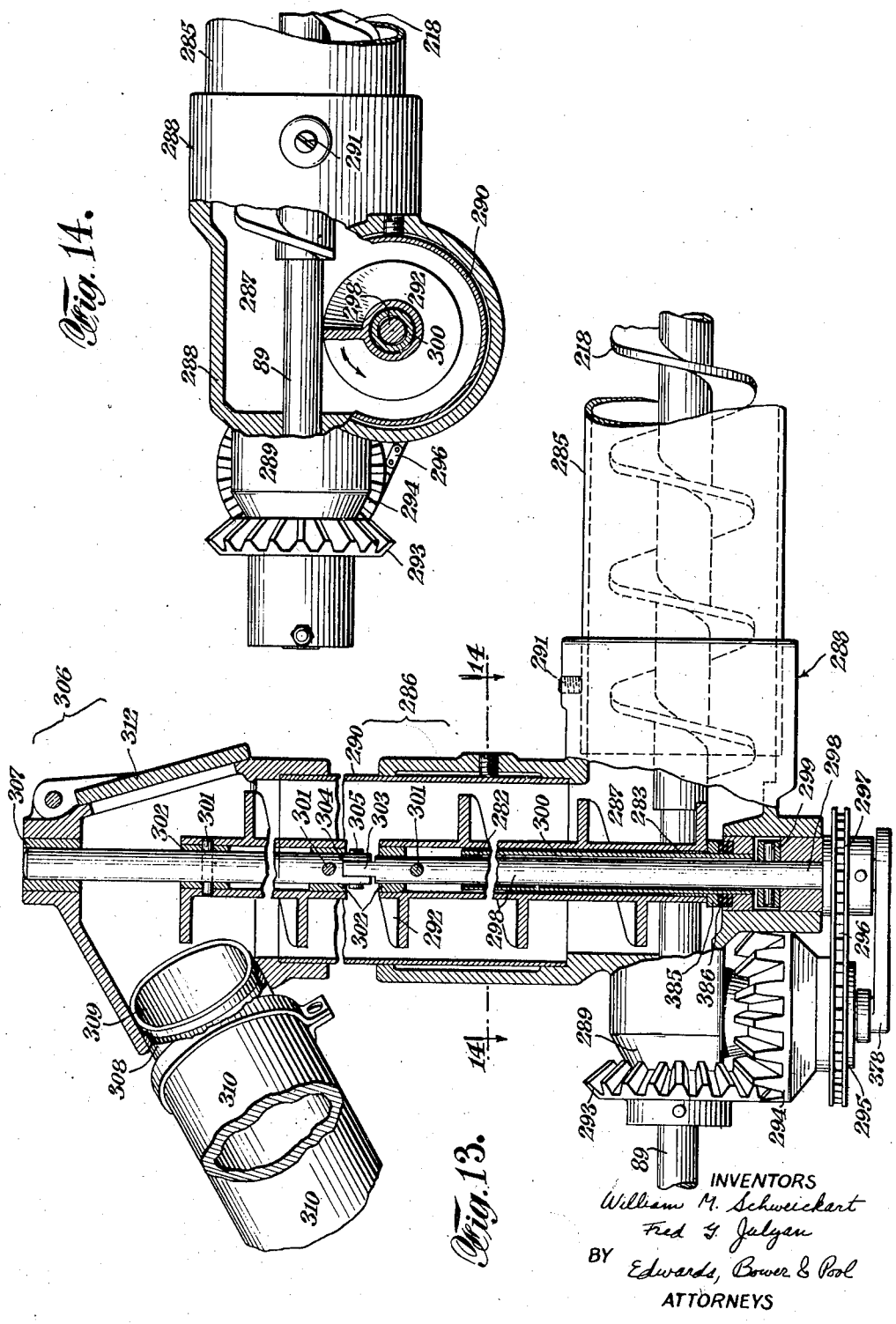

Oct. 3, 1944.     W. M. SCHWEICKART ET AL     2,359,445
STOKER
Original Filed Aug. 28, 1937     12 Sheets-Sheet 11

*Fig. 15.*

INVENTORS
William M. Schweickart
Fred T. Julyan
BY Edwards, Bower & Poot
ATTORNEYS Oct. 3, 1944. W. M. SCHWEICKART ET AL 2,359,445
STOKER
Original Filed Aug. 28, 1937 12 Sheets-Sheet 12
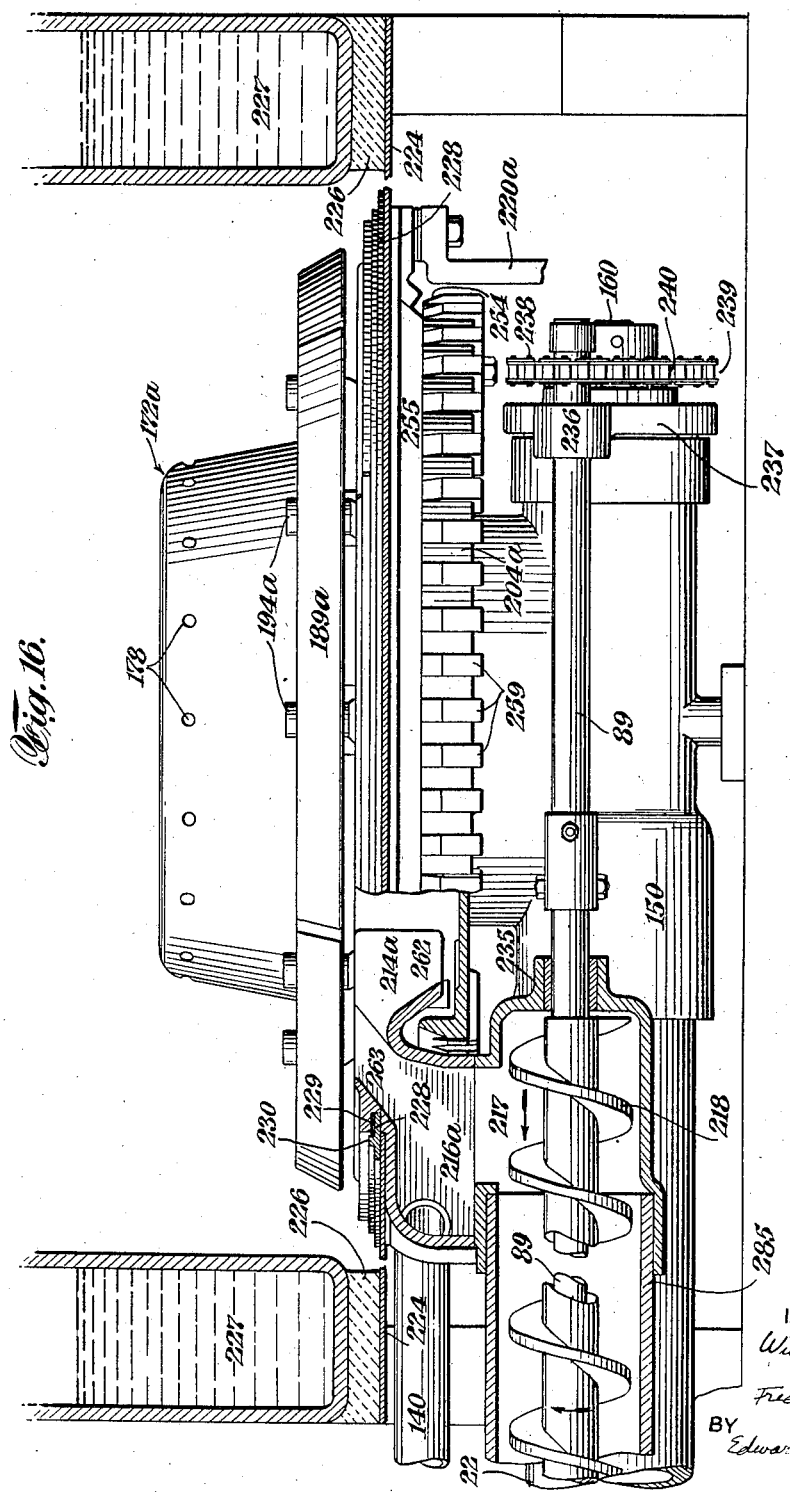

Patented Oct. 3, 1944

2,359,445

UNITED STATES PATENT OFFICE 2,359,445

STOKER

William M. Schweickart and Fred G. Julyan, Euclid, Ohio, assignors to Pocahontas Fuel Company Incorporated, New York, N. Y., a corporation of Virginia Original application August 28, 1937, Serial No. 161,494. Divided and this application March 14, 1941, Serial No. 383,432

29 Claims. (Cl. 110—45)

This invention relates to improvements in automatic coal burners.

A primary feature of this invention is the provision of a burner that will burn different types of coking coal efficiently and economically, in small domestic installations as well as in larger furnaces, and which is adapted to utilize various sizes of coal down to slack.

An important characteristic of the burner is the provision of improved means for translating the horizontal coal feed into upward feed at the bottom of the burner, avoiding any zone of high pressure at this point.

The burner is arranged to provide a novel combustion zone properly related to the feed so as to assure efficient coking, ignition and combustion of the solid and gaseous components without danger of back coking or clinker formation at points that would interfere with the coal feed and efficient combustion, arranged moreover to avoid the back flow of gas under appropriate operating conditions.

Another object is to provide a burner that will have high combustion efficiency, particularly when burning bituminous coal. The burner is arranged to produce a relatively thin bed of burning fuel, and to eliminate difficulties with clinker formation and ash accumulation which would tend to interfere with proper combustion. The ash removal mechanism removes the ashes and small clinkers rapidly and uniformly without interference with the fire bed, conveying them continuously to an ash discharge.

Another purpose is to improve the efficiency and control of the air supply to the fire. The forced draught is introduced in a zone at the top of the retort and outward over the grate, and is provided with an adjustment to meet the conditions of each installation as well as the varying fusion points and other characteristics of combustion of different types of coal. Under banking conditions provision is made for independent regulation of the air drawn by natural draught, permitting the efficient and certain maintenance of a suitable fuel bed.

A further object of the invention is to provide an effective dependable feed system for the coal from a bin collector to the retort where the coking and burning takes place. The conveyor receiving the coal from the bin collector conveys the coal faster than it is supplied by the collector and the supply of coal in the conveyor tube is thus stretched out and only partially fills the tube. At the delivery end of the conveyor where it enters the retort, the conveyor tube is filled with the coal for a variable short distance and we find that the conveying pressure of the coal in the partially filled tube is amply sufficient to maintain the tube full at the discharge end.

An important object is to provide apparatus embodying features set forth herein which is simple, compact, strong, suitable for installation under widely varying conditions and economical in operation.

Other objects and advantages of the invention will appear from the following description considered in connection with the accompanying drawings in which, Fig. 1 is a perspective view of the stoker with the bin collector omitted;

Fig. 2 is a side elevation of the drive unit;

Fig. 3 is a plan of said unit with parts in section and broken away;

Fig. 4 is a transverse vertical section on line 4—4 of Fig. 3;

Fig 5 is a detailed side elevation of the grate drive;

Fig. 6 is a fragmentary view of the gas collecting and return structure;

Fig. 7 is a longitudinal vertical section through the burner;

Fig. 8 is a plan view of the burner with parts broken away;

Fig. 9 is a side elevation of the burner with parts broken away;

Fig. 10 is a fragmentary side view showing the mounting of parts of the grate mechanism;

Fig. 13 is a central section through the ash elevator in a plane parallel to the ash removal screw with the discharge head rotated to show the discharge spouts;

Fig. 14 is a fragmentary section of the base of the ash elevator structure on line 14—14 of Fig. 13;

Fig. 15 is a view similar to Fig. 7 showing a modified form of burner; and

Fig. 16 is a side elevation of said modified form with parts broken away;

Figure 1:
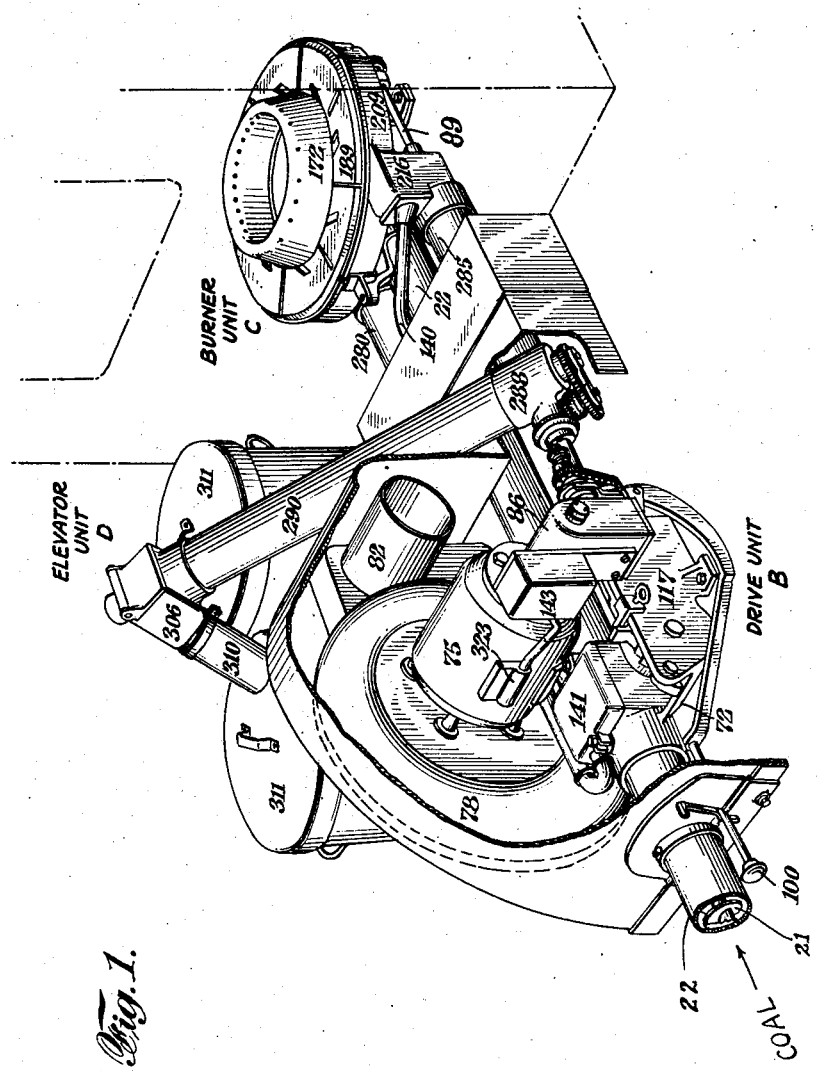

The specific embodiment shown in Fig. 1 comprises a drive unit B, a burner unit C and an ash discharge unit D.

A coal collector unit, not shown, is positioned in the coal bin and supplies coal to the coal feed tube 22 in which is positioned the coal screw 21, with the collector unit driven from the coal feed screw 21. A suitable collector unit is shown and described in our Patent No. 2,233,085.

Where the conveyor tube 22 requires a bend, this is preferably made as an angle, for instance, a right angle, through a feed knuckle (not shown) provided for conveying the coal around the angle.

The drive unit B includes the motor with its controls, the blower and air supply, the drive for the coal feed and ash discharge screws, the grate rotor drive and gas withdrawal construction, and is shown in Figs. 2–6.

The drive assembly is mounted on a base 72 provided with a longitudinal cylindrical passage 73 for the coal to which sections of the coal feed tube 22 are connected and through which the last section of the coal feed screw 21 passes. The base 72 above the coal feed end of coal passage 73 carries a cradle 74 (Fig. 4) supporting motor 75 by pin connection 105. The motor 75 is bolted as shown to the reduction gear casing 86, which in turn is supported from bracket 106 of the base 12 by a pair of lugs 107 and through pass bolts 14, 108. The lugs 107 form a three point support relieving the motor and the junction box from stress. The cradle-pin form 79 is affixed to the end of motor shaft 77 of motor 78 with the gear...

...rotor 77 is built up of a cast aluminum fan rotor 30 having a hollow extension 146 with a threaded opening 147 at the end for engagement. This wheel puller device facilitates motor or fan construction. The combined cast aluminum rotor and fan formation provides against rotor fatigue and failure under the constant vibration to which aluminum is used in these parts subjected in service. A suitable casing 79 surrounds the blower (Figs. 2–4) preferably provided (Figs. 2–4) opening to the right blower casing rectangular closed compartment. A large air inlet tube provides a definite col-...

...der normal loads, maintaining faces 387 and 388 in spaced relation; but yields under the end-wise thrust of said worm due to a predetermined overload to bring faces 387 and 388 into frictional engagement, the inclination of said faces being adapted to provide rapidly increasing friction after initial engagement protecting the working parts against breakage.

Drive shaft 85 is suitably connected to the coal feed screw 21, and to the ash removal shaft 89 hereinafter described. This apparatus includes an ash removal shaft 89 journaled to the coal and the coal feed screw 21 and in the base 72, both extend to the burner unit C. In the form illustrated herein, the ash removal shaft 89 is provided with a sprocket 90 on drive shaft 85 chain 91. Sprocket 92 is preferably arranged so that the run carrying the driving stress (the lefthand run as shown in Fig. 4) extends downwardly from sprocket 92 in a direction appropriate to throw such stress on the mounting lugs 107 of the gear casing 86. With this arrangement motor cradle 74 receives little, if any, of such stress and serves largely to stabilize the drive unit.

Means for disconnecting the motor drive from shaft 89 comprises a clutch 93 including dogs 94 on drive shaft 85 and interlocking dogs 95 in clutch housing 96 which carries sprocket 92 and is journaled on drive shaft 85 attached at its ends to thrust washer 97 and thrust collar 99 bearing against sprocket 98. Dogs 94 and 95 are normally maintained in engaging position by a spring 97 on shaft 85. An arrangement is provided for releasing the clutch 93, preferably operable by hand from a convenient point outside of the drive unit. In the form illustrated a handle 100 at the left of arm unit 101 (Fig. 3) is mounted on clutch release provided pivoted to ears 102 on the case 86 and engagement with fork 103 extending upwardly into housing 96 with annular flange 104 on clutch The burner unit C hereinafter described includes a rotating grate structure which is intermittently operated by suitable mechanism reciprocating shaker rod parting such proper rate. In the and 5, the sprocket 90 is provided for the cylindrical cam 112 mounted 110 rotatably pivoted 111 rocker arm Pawl between 119 on pawl 113 positioned to engage stop lug 120 adjustably mounted as by slot 121 and locking screw 122 on web 117 to control the length of the return throw of pawl 113. The lug 120 acts to swing the pawl 113 downward into engaging position with the ratchet 114. Cam roller 111 is suitably maintained in engagement with cam 110, as by leaf spring 123 bearing against base 72 and rocker arm 112.

The intermittent movement of ratchet 114, which in the form shown is actuated twice during each revolution of sprocket 90, is suitably transmitted to the ash grate, as by eccentric 124 mounted on ratchet 114 and carrying eccentric strap 125 on connecting rod 126 which may be connected to shaker rod 109 by a suitable shock absorbing arrangement. For this purpose rod 126 may terminate in frame 127 in which the spring cage 128 is mounted, including end flanges 129 in which shaker rod 109 is slidably mounted; between which flanges shock absorber spring 130 is set under initial compression and maintained in compressed condition by compression collar 131 held in suitable position on rod 109 by stop pins 133 projecting from shaker rod 109 in position to engage the adjacent flange 129 and collar 131 under pressure of spring 130. Collar 131 is held against rotation by engagement with cage 128, and operates through clamp screw 132 to hold rod 109 in adjusted rotated position. Cage 128 is preferably mounted removably on frame 127 as by screws 134. This shaker rod spring construction 130 will allow the stoker to run even though the grates are jammed, the rest of the mechanism continuing to function normally and the placing of the absorber spring 130 under initial tension is important to quiet operation.

This rotary grate structure surrounds an inner retort of the burner unit C of the type in which the coal is forced upwardly through the bottom of the burner retort or pot structure, burning in the upper portion thereof and traveling over the edge onto the great structure through which the ashes pass. In the arrangement disclosed in Figs. 7–10 the section of the coal feed tube 22 extending from the drive unit base 72 is clamped in the burner body 150 and supplies coal to the throat 151 at the bottom of the fire pot 152, which preferably is tapered outwardly from throat 151.

The lower portion of pot 152 may consist of a pot wall 153 integral with burner body 150, and a frusto-conical pot liner 154 having a smooth, preferably enameled inner surface, fitting within wall 153 and resting on a suitable ledge 155 to provide a smooth continuation of the surface of throat 151.

A principal problem in feeding coal to the bottom of burners of this type is presented by the difficulty hitherto encountered in forcing the coal slowly upward at right angles to the horizontal feed tube. The tendency of the feed screw is to force the coal against the surface in line with the end of the feed tube tending to produce a packed mass of coal at this point which greatly increases the resistance to the feed screw and introduces serious problems in providing feed screw bearings and suitable pot throat contours, and aggravates greatly the tendency of such mechanisms to become jammed by even slight increased resistance to the travel of the coal.

In the form specifically illustrated these objections are overcome by providing a pocket 156 extending beyond throat 151 concentric with the axis of coal feed screw 21, and mounting in pocket 156 a reverse screw 157. Feed screw 21 preferably terminates at a point in throat 151 slightly spaced in advance of the pot axis, and reverse screw 157 preferably terminates some distance on the opposite side of said axis, providing a balanced thrust from opposite directions substantially at the center of pot 152. In practice with feed and reverse screws approximately 2⅝" in diameter the ends of the screws are separated by 1" to 1½".

For drive purposes reverse screw 157 may be tubular and connected to the adjacent section of feed screw 21 by connecting shaft 158. A suitable bearing 159 mounted on the burner body 150 at the end of pocket 156 provides a suitable journal for the terminal shaft 160 rigidly mounted in reverse screw 157, the arrangement being such that terminal shaft 160, reverse screw 157, connecting shaft 158, and coal feed screw 21 constitute a continuous rotary coal feed screw structure which may be of any desired length and may be driven from an end thereof, as hereinafter set forth.

Bearing 159 includes a head 159a carrying a journal bushing 159b for the hub 159d of sprocket 239 which bears against thrust ring 159c. A suitable outlet 159e for material passing ring 159c may be included.

To provide for supply of air to the burning fuel, inlet air chamber 161 surrounds the pot wall 153, formed by bottom wall 162 and outer wall 163 and generally open at the top.

A suitable upper margin for the pot 152 is provided preferably in separable form and is generally referred to as a retort. While the retort may be formed and mounted in various ways, it is advantageous to provide a retort base ring 166 which may perform a number of functions. In the form illustrated ring 166 is held in position by bolts 167 threaded into lugs 164 on outer wall 163 of air chamber 161, and may have a sealed engagement therewith by employing an asbestos gasket 168. Base ring 166 may likewise form a closure for the juncture between pot wall 153 and pot liner 154, the form shown in Fig. 7 having an annular ridge 170 engaging a seal ring 169 of asbestos or the like located on the suitably beveled edges of wall 153 in liner 154. The ring 166 is provided with openings 171 (Fig. 8) to permit the air from air chamber 161 to pass upwardly to the retort.

The retort 172 is removably mounted on the base ring 166 and forms a continuation of the pot 152, being provided with air outlets or tuyères for furnishing air in the most advantageous zone for efficient operation. In the form shown in Figs. 7–9 the retort 172 is provided with an inner wall 173 forming a continuation of pot 152 and the inner face of base ring 166, and resting on an asbestos gasket 174 in a suitable depression in base ring 166. The outer wall 175 slopes outwardly and downwardly to the grate structure, and rests on an asbestos gasket 176 in a suitable depression in base ring 166. The retort crown 177 provides an integral smooth curve between walls 173 and 175, and is preferably relatively narrow to prevent retention of material thereon.

Suitable tuyère openings 178 extend through the retort 172 at appropriate points. It has been determined that with the arrangement described the most advantageous construction comprises provision of a series of tuyères 178 adjacent the upper part of the inner retort wall 173, preferably sloping slightly downward, and a smaller number of tuyères 178 extending through the upper part of the outer retort wall 175 at about the same level. The retort 172 is held in place by means which preferably permits its ready removal and replacement, such as hooks 179 which may be cast integral with the retort walls 173 and 175, and which engage the lower face of the retort base ring 166 through suitable retort lock openings 180.

The rotary grate structure located around the retort 172 is adapted to receive the burning coal and ashes which flow outwardly over the retort, sifting the ashes into a suitable annular receiver in which they are carried around the burner to a point of discharge. The various parts are carried by a rotor ring 181 which is rotatably mounted on the pot 152. The mounting of rotor ring 181 on ball bearings is such that the parts may be readily assembled, the bearing will be easily accessible and the structure will function smoothly under the substantial variations in temperature and consequent expansion and contraction of the parts encountered under these conditions, the ball race being formed by cast surfaces. The arrangement comprises a ball race groove 182 in the inner face of the upper part of rotor ring 181. An upwardly beveled flange 183 on wall 163 and a downwardly beveled flange 184 on base ring 166 are arranged to provide a ball race groove 185 cooperating with groove 182 to retain the balls 186. By the removal of retort base ring 166, the balls 186 will be readily accessible; and as the faces of grooves 182 and 185 are substantially at 90° to each other, their spacing permits smooth unobstructed travel of the balls under various conditions of expansion due to changes in temperature.

The outer margin of the retort base ring 166 is provided with an apron 187 extending outwardly and downwardly over the upper edge of the rotor ring 181, apron 187 providing a smooth path of flow for ashes around the ball bearing structure and beyond the outer face of rotor ring 181, the adjacent faces of apron 187 and rotor ring 181 being suitably shaped to provide a relatively slight clearance and prevent substantial amounts of ashes from reaching the balls 186, the opening 149 below said balls permitting any ashes or the like to fall out of the raceway. The annular pocket 233 below apron 187 accumulates ashes and an inner seal of ashes 234 is formed at the lower edge of the apron, restricting the passage of air to the space above the grate.

In the embodiment shown in Figs. 7–9 a grate ring 188 is utilized, removably mounted on rotor ring 181 and adapted to receive removable grate segments 189. These segments are preferably flat integral castings provided with an inner flange 190 extending into close relationship to retort base ring apron 187. Suitable slots permitting ashes to pass the segments 189 include the radial slots 191, restricted marginal slots 192 in flange 190, preferably angled inwardly in the direction of rotation, and the spaces left between the periphery of each segment 189 and the adjacent parts.

Segments 189 are mounted on the grate ring 188 in suitable manner securely held in operation but permitting ready removal and preferably adapted to construction by casting. In the form shown in Figs. 7–9 each grate segment 189 is provided with two downwardly extending slightly elongated annular sockets 193 adapted to receive supporting studs 194 on the upper margin of grate ring 188. An integral locking tongue 195 on the advance end of each segment 189 extends beneath a locking lug 196 formed on the upper edge of grate ring 188. Grate ring 188 may extend to a point higher than the lower edge of apron 187, the intervening space normally filling with ashes which form the air seal across the narrow slot between the apron margin and ring 181.

The grate ring 188 is suitably mounted on rotor ring 181 to permit ready removal without affecting the rigidity and reliability of the mounting under service conditions. A suitable arrangement is indicated best in Figs. 8 and 10, and includes beveled wedge lugs 197 on rotor ring 181 engaging beveled wedge lugs 198 on grate ring 188 to force the grate ring downwardly into proper position by rotating it relative to rotor ring 181; stop lugs 199 on rotor ring 181 and removable locking slugs 200 fitting between stop lugs 199 and wedges 197 when the grate ring 188 has been turned into proper position.

The grate rotor structure is preferably provided with an ash table 204, receiving ashes which pass the grate segments 189 and conveying such ashes to a point of discharge. A plurality of ash table segments 205 form a continuous annular platform around rotor ring 181 adapted to receive the ashes. Each table segment 205 is provided with an inner flange 206 extending inwardly and upwardly, resting on an annular shoulder 207 on rotor ring 181, the abutting edges of the table segments 205 being in overlapping relationship to provide continuity and accurate registration. The lower rim 208 of grate ring 188 bears against flanges 206 and securely locks the table segments 205 in firm fixed position when wedge lugs 197 are forced against wedge lugs 198 as above described. Table segments 205 may be accurately located by positioning lugs 201 on rotor ring 181 engaging corresponding positioning recesses 202 in segments 205.

An ash trough extends around and below the ash table segments 205, for the direct discharge of ashes from the ash table. The ash trough 209 (Figs. 7–9) has an outer wall 210, a bottom 211 extending beneath and slightly spaced from the table segments 205, and an inner flange 212 extending upwardly substantially beyond the lower face of table segments 205. Segments 205 are preferably provided with diagonally tangential ribs 213 which serve to plow outwardly toward wall 210 ashes which fall between ash table 204 and wall 210, preventing the ashes from escaping over flange 212 while avoiding any engagement between the rotating and fixed parts. The ashes brushed outward by the ribs 213 accumulate at the outer edge of the bottom plate 211 and form an outer ash seal 261 at the periphery of the table 204 so as to restrict the flow of air to the space above.

The ashes carried around by ash table 204 are continuously discharged by a simple scraper arrangement (Figs. 7 and 8) including an ash plow or vertical plate 214 on the outer wall 210 of the ash trough extending into juxtaposition to the ash table 204 and grate ring 188 and deflecting ashes outwardly through discharge opening 215 in wall 210 into the ash discharge pocket 216 formed in said wall. An ash discharge chamber 217 forms a downward continuation of pocket 216 and houses the receiving end of the ash removal screw 218 mounted on ash removal shaft 85.

A suitable arrangement is provided for supporting ash trough 209 and for connecting it to the furnace body. For convenience, trough 209 may be constructed in three segments as shown, supported at the right of the burner (Figs. 8 and 9) by bracket legs 220 overlying the junctions of the segments 219 and removably mounted on the burner body 150 to permit convenient mounting and disassembly of the ash trough 209. The remaining junction between segments 219 overlying the coal feed tube 22 is supported by a bracket 221 on the burner body 150, provided with a detachable clamp 222 overlying the junction and which may be detachably fastened to the bracket 221.

The upper margin of the ash trough 209 is connected to the furnace body to close the space between the body and the burner unit. This may be accomplished by providing a closure plate 224 resting on shoulder 225 formed at the upper margin of outer wall 210 of the ash trough, and extending outwardly to the furnace walls. A suitable filling or lagging 226, such as furnace cement or the like, may be employed to fill the spaces between plate 224 and the furnace walls, which in Fig. 6 are shown as comprising the usual water leg 227 of a domestic furnace. Plate 224 may be locked on shoulder 225 by segmental locking plates 228 fitting into an annular recess 229 in the upper margin of the outer wall 210 of the ash trough and provided with a longitudinal rib 230.

The mechanism for rotating the grate unit employs an intermittent drive, imparting a periodic impact to the rotating structure, as such an arrangement serves to break up the fuel mass and to facilitate the sifting of the ashes and small clinkers through the grate. In the construction shown in Figs. 5 and 11 the shaker rod 109 extends beneath the ash trough 209 and is pivotally connected at its ends to the lower end of a feed dog arm 241 extending upwardly between the air chamber 161 and the grate rotor ring 181 and having at its upper end a feed dog 242 projecting laterally between the support flange 243 on the inner face of rotor ring 181, and rack 244 on said ring overlying flange 243. The feed dog 242 is provided with a rocking face 245 riding on flange 243, and suitable teeth 246 at its forward end adapted to engage rack 244. The arrangement is such that when the shaker rod 109 is shifted to the left of Fig. 5 the dog 242 will be rocked on face 245 until teeth 246 engage rack 244, further movement of the shaker rod 109 serving to rotate ring 181 and the grate parts mounted thereon, while ring 181 will be free from dog 242 at the end of such stroke and during the return stroke of shaker rod 109 owing to the disengagement of teeth 246 when the dog 242 is rocked in the reverse direction by continued travel of the grate rotor ring 181 under its own momentum or by the return travel of shaker rod 109.

To prevent reverse rotation of the grate ring 181 and associated parts a detent dog 247 is provided on detent arm 248 pivotally mounted on stud 249 on the burner body 150 at any convenient circumferential point and held yieldably in operative position as by counterweight 260.

Figure 11:
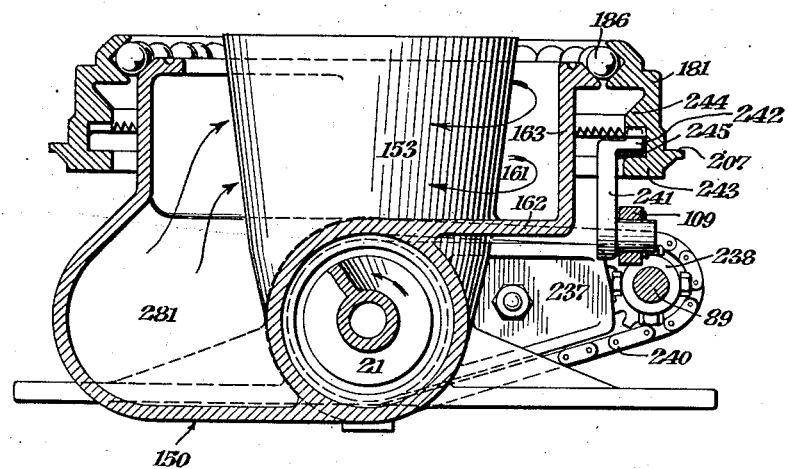
Fig. 11 is a fragmentary vertical section on line 11—11 of Fig. 8 showing the air feed and the grate drive.
Figure 12:
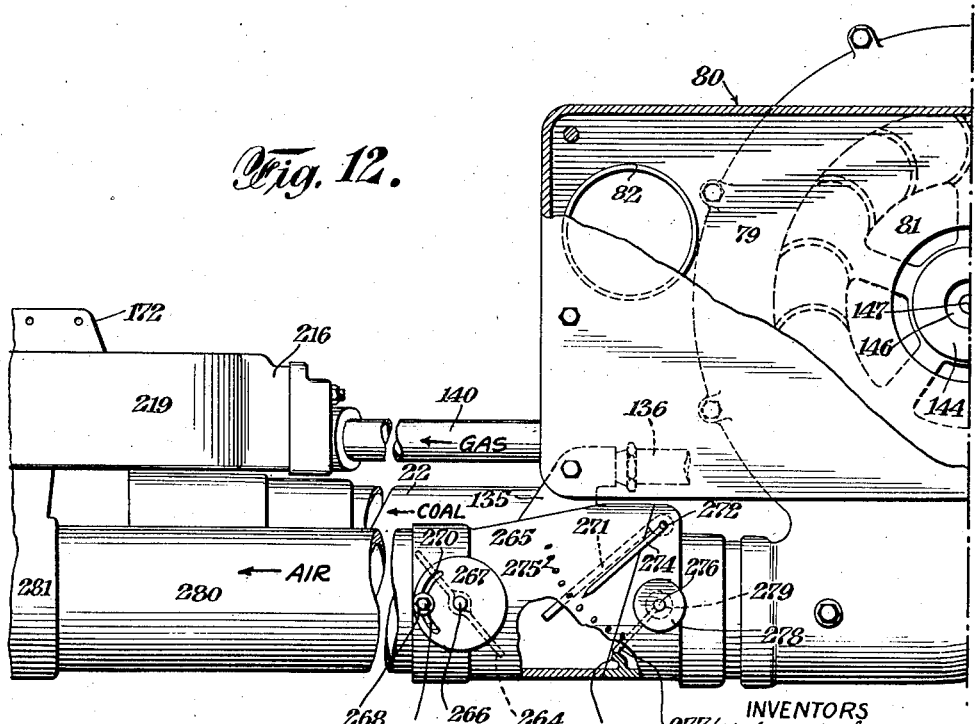
Fig. 12 is a fragmentary side elevation of the blower and air control from the right-hand side of Fig. 4.

Figs. 11 and 12 show the air supply and control system between the blower 78 and the burner unit C. The volume of air from blower 78 is suitably regulated, as by butterfly damper 264 mounted in air control housing 265 on spindle 266 preferably provided with suitable locking means, the form illustrated having a locking disc 267 mounted on the end of spindle 266 at the rear of housing 265 (Fig. 3) and held in adjusted position by locking knob 268 threaded on screw stud 269 extending through concentric slot 270 and mounted on housing 265.

Means are provided for indicating the flow of air from blower 78, for preventing backflow into the blower system from the burner unit C, and for permitting a regulable flow of air to the burner unit when the blower is not in operation. These functions may all be performed by a single mechanism comprising a valve flap 271 fixed to pivot spindle 272 located in the upper part of a section of the air control housing 265 in advance of damper 264 and engaging valve seat 273, which is preferably inclined in the direction of air flow from the blower. The end of spindle 272 may be bent downwardly outside of housing 265 to form a pointer 274 serving in conjunction with suitable marks 275 or the like on the outer face of housing 265 to indicate the position of flap 271.

To arrest valve flap 271 at a predetermined preferably variable distance from seat 273 we provide a natural draft regulator spindle 276 threaded in housing 265, provided with a laterally extending stop arm 277 within housing 265 positioned for engagement with the face of flap 271 and serving as a variable stop for arresting the downward movement of flap 271 at any point between the valve seat 273 and the maximum desired opening of flap 271 by rotation of spindle 276 by means of knob 278, spindle 276 being frictionally held in adjusted position as by spring washer 279.

The air control housing 265 is connected to a suitable air duct 280 running to air inlet chamber 281 (Figs. 8 and 11) in the burner body 150, and merging, around the casing for the coal feed passage, with the air inlet chamber 161 to provide a generally tangential air feed adapted to distribute the air evenly throughout the air chamber 161 and thence to tuyères 178.

A suitable arrangement is provided for automatically removing the ashes from the burner unit C and discharging them at an appropriate point, the construction preferably including an ash removal conveyor and an elevator for transferring the ashes from the conveyor to a suitable discharge point. In the form illustrated the ashes are removed from the ash discharge chamber 217 (Fig. 9) by ash removal tube 285 mounted in the burner body 150 and forming a continuation of chamber 217. Tube 285 extends to an appropriate point and is shown as terminating adjacent drive unit B (Figs. 1 and 3). At this point a suitable elevator unit D is positioned to receive the ashes. A convenient construction is disclosed, employing an arrangement in which the ash removal tube 285 terminates in an elevator pocket 287 (Figs. 13 and 14) formed in elevator base 288. Ash removal screw 218 terminates at the pocket while the shaft 89 on which the screw is mounted extends through the pocket and a suitable bearing 289 at the opposite side of the elevator base 288, and thence to the drive mechanism as already set forth.

An elevator tube 290 is mounted in elevator base 288 extending from pocket 287 upwardly in any desired direction to permit discharge at any apropriate point dictated by local conditions, the angle of tube 290 being readily adjusted by clamping base 288 in any desired rotated position about ash removal tube 285 through clamping screw 291. An elevator screw 292 is positioned in tube 290 to pick up ashes discharged into pocket 287 and raise them in tube 290 to a discharge at the upper end of the tube. Various methods of mounting and driving screw 292 may be employed, and preferably are arranged to permit accessibility and removal of screw 292 without dismantling the supporting and driving arrangement. In the form illustrated, the screw 292 is driven from a bevel gear 293 on shaft 89 driving bevel gear 294 mounted on elevator base 288 and carrying sprocket 295 which through sprocket chain 296 drives sprocket 297 on elevator shaft 298 mounted in thrust bearing 299 in the elevator base 288.

Means may be provided for protecting the lower end of the shaft 298 from the ashes in pocket 287, as by protector sleeve 300 mounted in fixed position on base 288 surrounding elevator shaft 298, and serving as a guide and support for the tubular elevator screw 292 rotatable around sleeve 300. Screw 292 is suitably attached to shaft 298 above sleeve 300, as by pins 301 and spacer rings 302.

Sleeve 300 is maintained in proper spaced relation to shaft 298 and screw 292 by suitable bushings such as the leaded bronze bushings 282 between the upper end of sleeve 300 and shaft 298, and leaded bronze bushing 283 between the lower end of screw 292 and tube 300. A suitable sealing bearing is provided between the lower end of screw 292 and the base 288 and comprises a leaded bronze thrust washer 385 and a suitable resilient backing such as rubber rings 386 surrounding shaft 298.

To aline the bearings at the ends of shaft 298, a suitable self-alining joint is provided, such as that illustrated in Fig. 13, in which the lower section of shaft 298 is provided with a tongue 303 held in a corresponding slot 304 in the upper section by pin 305, the construction being arranged to permit the very slight play necessary to assure smooth running in the bearings. Screw 292 will of course be broken at the flexible connection as shown.

A suitable discharge arrangement is provided at the upper end of elevator tube 290. This may comprise a discharge head 306 mounted on the upper end of elevator tube 290 and carrying an upper bearing 307 for the elevator shaft 298. Head 306 is provided with suitable spout discharge means, the illustrated construction employing two discharge spouts 308 and 309, each of which may be provided with a flexible tube 310 clamped thereto for directing the ashes to any suitable receptacle, such as ash can 311 (Fig. 1). A suitable hinged door 312 may be provided opposite spouts 308 and 309 to permit access to the mechanism and to serve as an overflow outlet for ashes when the spouts 308 and 309 are filled or obstructed.

A suitable arrangement is provided for driving the coal feed screw 21 from shaft 85. In the arrangement indicated in Figs. 7, 9 and 11 shaft 89 extends through a bearing 235 in chamber 211 and bearing 236 on bracket 237 on burner body 150, and drives coal feed screw 21 through sprockets 238 and 239 (on shafts 89 and 160 respectively), and sprocket chain 240.

A modified burner construction is shown in Figs. 15 and 16. In this arrangement the retort 172a is provided with a depressed portion 250 immediately below the inner tuyères 178 to facilitate the introduction of the air, and is relatively higher, the outer retort wall 175a having a relatively sharp downward slope toward the grate. Retort 172a is held in position by locking hooks 251 on the retort base ring 166a engaging crossbars 252 in retort 172a. The grate segments 189a are mounted on studs 194a carried directly by the rotor ring 181a and extending through the top of sockets 193a, the segments 189a resting on suitable flanges 253 at the base of studs 194a.

The ash table 204a is mounted directly on rotor ring 181a and is arranged to retain the ashes by including an upwardly extending lip 254 at its outer margin, dispensing with the use of an ash trough. Mounted in place of such trough but in the same general manner is a conical ash hopper wall 255 having its lower rim 256 extending downwardly inside lip 254 and provided with diagonal ribs 257 on its lower face arranged to plow inwardly ashes which tend to work beneath rim 256 toward lip 254. The ash hopper wall 255 may be arranged and supported in the same manner as the ash trough 209, but legs 220a and bracket 221a may carry detachable retaining clamp members 258. Ash table 204a may be provided with suitable means, such as ribs 259 extending upwardly around lip 254, which may be engaged by a poker or other suitable implement for manually rotating or shaking the grate structure.

A somewhat different ash discharge arrangement is employed with this modification, the ash plow 214a having an advance portion 262 curved upwardly and outwardly to convey ashes accumulating on table 204a over lip 254 into the discharge passage 263 communicating with ash discharge pocket 216a.

While various proportions and designs may be employed in the different parts of the apparatus disclosed herein, the proportions are of importance in various parts, and particularly in the burner structure, the size and proportions of the pot, retort, grate segments, ash slots in the spacing thereof, having been determined after substantial experiment as adapted to most efficient operation with coking bituminous coal; and the drawings herein are drawn to scale to show the proper dimensional relationships between the various parts.

A suitable electrical control arrangement (not shown) is provided, and may be of the type in which the motor 75 is operated at full speed at suitable intervals, though the invention is not necessarily restricted to a control of this type.

Under certain circumstances, and particularly when burning certain types of coal, gases may be forced back through the coal feed tube 22, and an arrangement is provided for preventing the escape of such gases. Such an arrangement may include a trap in which the gases will collect, and means for conducting the gases from the trap to a suitable discharge. In the preferred arrangement the gases are conveyed to the burner. Owing to the relatively low velocity of such gases it has been found that under certain conditions there is a tendency for fine solid particles to accumulate in the return pipe and eventually to clog the pipe. The preferred form therefore includes means for preventing such accumulation of dust and the like, and for returning the gases to the burner or elsewhere by positive means, such as a suitable supply of air, which may be taken from the blower system.

An arrangement of this type is embodied in the preferred form illustrated herein, and is shown best in Figs. 3 and 6. It includes a fresh air connection 135 with the outlet of blower 78 connected by air pipe 136 and return bend 137 with jet nozzle 138 extending through a wall of the gas pocket 139 formed in the upper face of the coal feed passage 73 in base 72. The fresh air connection 135 thus utilizes a higher pressure from the blower than can be found anywhere beyond the damper control. A gas return pipe 140 extends through the other side of pocket 139 in alinement with nozzle 138 and spaced therefrom by a distance suitable for obtaining an injector effect under the conditions of air pressure and dimensions employed in the arrangement. The gas return pipe 140 is connected to the burner unit C in a manner hereinbefore set forth. Gas pocket 139 is sealed by a removable cover 141.

While the apparatus is adapted for use with various types of coal it has been particularly designed to solve certain special problems encountered in the burning of bituminous coal, which has special characteristics affecting its collection, transportation and combustion.

Proper feeding of the coal is highly important, for the purpose of assuring proper burner operation, for economy in driving the feed screws, and to avoid the jamming of the feed which has heretofore been a prolific source of trouble in apparatus of this type. A feature of the present arrangement involves keeping the feed tube 22 substantially less than full of coal, and preferably about half full.

The arrangement likewise permits the use of screws driven in the same direction, permitting the employment of a single type of screw for the entire feed. The connection between the feed shaft sections comprising a stub shaft connecting the hollow ends of the shaft sections furnishes a flexible joint easily assembled in the field and offering very little restriction to the flow of the fuel. All of the screw sections comprising the entire coal feed system are under tension from beginning to end, preventing buckling of the sections and tending to keep all parts in alinement.

The burner unit C is particularly designed to provide thoroughly efficient combustion both under active operating conditions during coal feed and operation of the blower, and under banking conditions. There is also secured a careful balancing between the rate of coal feed, the rate of air supply and the combustion characteristics of the coal, both as to the time required to burn to ash and the volatilization of combustible gases. The latter problem is especially important in the burning of bituminous coal, and involves likewise the formation of coke, which heretofore has been a source of serious difficulty and obstruction due to the tendency of the coal to coke back into the feed zone, interfering with the operation of the feed mechanism and frequently causing complete stoppage of the machine. The design also contemplates the effect of oil which is frequently used for dust prevention.

The rotating element 157 provided at the side of the throat opposite to the discharge end of the coal feed tube serves to prevent the coal from forming a packed mass at this point, and thereby increasing notably the facility with which it may be forced upwardly by the horizontal pressure of the feed screw. In one sense it may be said that this auxiliary screw increases the relative fluidity or flowing qualities of coal at this point. In the preferred form the rotating element is in the form of a reverse screw exerting a counterbalancing horizontal pressure on the coal discharged by the feed screw while likewise preventing the formation of a solidly packed mass of coal, the result being that the coal will travel upward as gradually as may be desired without exerting any pressure whatever on the surfaces opposite the coal feed tube discharge. The reverse screw may be arranged to impel coal continuously away from the feed screw bearing, which may therefore be of any desired type. The elimination of the tendency to pack the fuel in throat 151 furthermore permits the maintenance of fuel feed in tube 22 at substantially less than the full capacity of the tube as already indicated, since substantial back pressure on the fuel at the burner owing to the resistance caused by forcing the fuel upward under previous conditions causes the coal to back up along the feed screw; and even if feeding at less than coal tube capacity is attempted, substantial back pressure at the burner and the resultant accumulation of coal in the tube will make it impossible to operate the feed tube 22 partially filled at any point within a substantial distance of the burner. With the construction illustrated however the feed tube is filled for only a short distance from the burner, an arrangement which not only reduces to a minimum the power necessary for feeding at this most exacting point, but which is also desirable since a full feed tube 22 for a short distance from the burner is serviceable in forcing the gases to travel upwardly through the burner and not back through tube 22.

In burner retorts of the prior art difficulties have been encountered because of the tendency of the coal under certain conditions to burn down in the pot toward the feed screw, resulting in the formation of coke and clinkers which obstruct the feed and burning of the coal and may result in breakage or stoppage of the mechanism. The travel of the coal upwardly in the pot may likewise be obstructed by the formation of clinkers and the like which adhere to the pot walls, and by mechanical obstructions provided by the wall surfaces. In the present construction a retort is provided in which the zone of active combustion is restricted to the upper portion, and which extends downwardly for a sufficient distance below the lowest point of air supply so that the fire will not reach the region where formation of clinkers, coke and the like will interfere with the feed mechanism. Any clinker formation developing will be prevented from adhering to the pot by the smooth liner 154 but will be forced upward and broken up by the incoming coal.

Under full draught conditions the relation between the coal feed and the rate of combustion is such that the burning fuel overflows gradually across the retort 172 and over grate segments 189, and may reach the walls of the furnace. The relatively slight projection of the retort 172 above segments 189 facilitates the lateral flow, and is particularly advantageous in bituminous coal combustion in which the incandescent coke is more or less fluent, the arrangement permitting the formation of a relatively wide thin fire which produces maximum efficiency, rather than a high fire above the retort. The rate of combustion will naturally increase with the spreading of the fire until it will equal the rate of coal feed when the fire has reached its maximum area at the walls of the furnace. The inner tuyères 178 assure full combustion of gases which pass upwardly from the coking zone and provide an adequate supply of air for full combustion, the outer tuyères in wall 175 assisting if necessary in the combustion of the portion of the fire outside of the retort 172. The spreading of the fire is facilitated by the unusual power of the upward thrust of the coal, which likewise serves to scour away any clinkers which may tend to form on and adhere to the surface of the pot structure or retort 172.

When the drive unit is cut off and the fire operates under banking conditions, the portion of the burning coal beyond retort 172 will gradually burn up, and if banking conditions are maintained for a sufficient period, the fire area will gradually contract toward retort 172. Eventually the fire may contract to a zone in the upper part of retort 172 limited in depth by the distance that air will penetrate from tuyères 178. This arrangement, limiting the bank tuyère to a zone at the top of the pot substantially spaced from the feed worm 21, eliminates the possibility of coking back under banked conditions, a serious difficulty with prior arrangements. At the same time a small zone of definitely burning fuel is maintained so that when the drive unit is again started and the coal feed is resumed, there will be no difficulty about kindling promptly the green coal that is more or less abruptly forced upwardly in the pot 152.

When operating under banking conditions air is drawn through the tuyères 178 by the ordinary stack draught in a manner similar to the operation of hand-fired coal furnaces. This is made possible by the action of stop arm 277 which holds valve flap 271 open to the proper extent, thereby permitting the maintenance of a minimum bed of burning material without risking the extinguishing of such bed by insufficient air, sudden influx of fuel or the burning out of accessible fuel by excessive draught.

The arrangement likewise is adapted to minimize the tendency to form coke in the lower portion of the pot where it might interfere with screw 21 through the depth of the pot, the air-cooled walls and the double-wall construction. If however coke should form in throat 151, it would not wedge between the screw and the end of the feed passage, as in prior arrangements, but would tend to be broken up by the rotary action of the feed screw 22 and reverse screw 157.

The rotary ash collecting unit is arranged to remove accumulations of ashes with a minimum disturbance of the fire bed. This operation is facilitated by the smooth-surfaced grate segments 189 and the intermittent shaking action imparted thereto. The formation of the described type of fire bed likewise facilitates the scouring of fine clinkers from the retort 172 and their discharge on to segments 189, which may be provided with slots sufficiently large to receive the small clinkers as formed and to maintain a clean fire even under conditions which operate the burner at infrequent intervals. The ashes are effectively sealed in the ash receptacle and readily discharged from the burner in a manner already indicated.

Any gas which is formed will normally be generated so high in the pot 152 that it will tend to flow upwardly and to be burned; but in case gas is forced back through coal feed tube 22 it will be positively returned to the ash pocket 216 by the action of jet nozzle 138, and will pass upwardly to combustion past the grate segments 189. This arrangement will also provide a slight air feed outside of the retort 172 which will be operative to some extent when the blower 78 is not running, since the natural flue draught of the furnace will exert a certain suction effect on the gas return pipe 140. This arrangement also prevents any tendency for dust to collect in the gas return line. It may be noted that when the valve flap 271 is allowed to fall upon its seat it provides positive means for preventing gases from the combustion zone from returning through the blower structure, if conditions should arise that demand such an arrangement.

The operation of the arrangement for conveying the ashes to a suitable point of discharge will be apparent from the detailed description. The construction is such that the ashes may be discharged at any desired point, and are kept completely housed in conveniently located conveying tubes.

The drive, operated by a single motor and compactly arranged, is constructed so that the blower may be operated without the coal feed, which may at times permit operation by hand firing in cold weather pending repairs to the coal feed mechanism. The clutch 93 is likewise arranged to permit throwing in the coal feed and ash removal mechanism abruptly after motor 75 is up to speed, exerting a sudden impulse that may be valuable in dislodging a slight obstruction. The apparatus is likewise arranged so that the motor 75 will be stalled before breakage of any of the drive parts, allowing the electrical system to throw out the motor circuit and take care of emergency conditions without damage to any part of the machine. This result is accomplished partly by the strength and simplicity of the construction, partly by the use of especially strong feed screws, and to some extent by the use of a special thrust bearing 388, which serves to take a substantial part of the stress caused by an obstruction to the conveying mechanism thereby reducing correspondingly the maximum stress on such mechanism, without materially reducing the power transmitted from the motor 75 under normal conditions.

The blower structure has been carefully arranged to give rapid and accurate control of an adequate supply of air at all times without the usual excessive intake noise.

The air supply for the fire is intended to come mainly from the tuyère openings of the retort walls 173 and 175, and this supply serves in addition to maintain a proper cooling of the retort. Where there is an insufficient supply of air through the retort, there is a tendency for these parts to overheat and cause an improper coking and clogging of the rising column of coal. It is therefore desirable to control the other sources of air to the space above the grates and the inner and outer ash seals above described, or some other suitable regulation of the air supply below the grate, should be provided. Under running conditions not over 50% of the total air supply should enter through the grates and under banking conditions this should be further reduced.

All of the screw parts picking up the coal from the bin and delivering it to the retort are retained under tension in operation, preventing buckling of the sections and keeping all of the connections extended. The sections of the coal feed screw have their hollow shafts connected in simple manner by the connecting shafts fitting into the hollow shafts at each end, making flexible connections easily installed in the feed and offering practically no restriction to the passing of the coal in operation.

This is a division of our application Serial No. 161,494, filed August 28, 1937, and issued December 22, 1942, as Patent No. 2,306,189.

We claim:

1. In an underfeed stoker, the combination with a burner of a screw conveyor for feeding coal to the burner, said coal screw conveyor being substantially horizontal with its burner end adapted to be positioned relatively close to the furnace ash pit floor, a screw conveyor for removing ashes from the burner, said ash screw conveyor having its burner end at substantially the level of the burner end of the coal screw conveyor, means for driving the ash screw conveyor from its discharge end, and a driving connection, operating solely in vertical planes and adapted to be positioned outside of the burner, connecting the burner ends of the coal and ash screw conveyors.

2. In an underfeed stoker removing fuel from a fuel container and burning it within a domestic type furnace, the combination of fuel feeding means including a screw for drawing fuel from said container, a burner including a retort fed by said means and beneath which said screw extends, ash removing means including a passageway through which ashes from the retort may be discharged and an ash conveying screw in said passageway coupled to the end of said fuel feeding screw distant from the fuel container and positioned with its burner end not appreciably below the level of the burner end of the fuel feeding screw so that a minimum proportion of the over-all height of the burner is devoted to the fuel feeding and ash removing means, and means for driving said screws from the outer end of the ash conveying screw.

3. In an underfeed coal stoker removing fuel from a coal bin and burning it within a domestic type furnace, the combination of a retort including a coal passageway and an air chamber surrounding at least part of the coal passageway, a substantially horizontal coal tube adapted to communicate with said coal passageway in the retort, a coal feeding worm within said coal tube having a shaft at the discharge end thereof projecting from the retort beyond the retort air chamber, an ash removal duct extending into the ash pit of the furnace, an ash worm within said ash duct having outside of said retort a driving connection to the projecting shaft of the said coal feeding worm and means for driving said ash worm from the discharge end thereof.

4. The combination set forth in claim 3 in which the retort is substantially circular and ash receiving means are provided for receiving the ashes from above and moving them to and into the ash removal duct at the receiving end of the ash worm, said ash receiving means comprising an ash table and cooperating walls for retaining the ashes on the ash table, all surrounding the retort below the top thereof but above the ash removal duct and directly over the drive means and thus acting to prevent ashes from falling upon the driving connection between the ash worm and the coal feeding worm so that the driving connection, although outside of the retort, operates in an ash-free furnace ash pit.

5. The apparatus set forth in claim 3 in which the ash removal duct is positioned alongside of the coal passageway and the driving connection is a chain and sprocket drive, with the retort being provided with an ash table and cooperating walls for retaining the ashes on the ash table, all surrounding the retort below the top thereof but above the ash removal duct and directly above the driving means including the chain and sprocket drive, for receiving the ashes from above and moving them to and into the ash removal duct at the receiving end of the ash worm, said ash table and cooperating walls acting to prevent ashes from falling upon the chain and sprocket drive so that such drive, although outside of the retort, operates in an ash-free furnace ash pit.

6. A coal stoker having in combination a coal tube, a coal compartment communicating with one end of said coal tube, a retort communicating with the opposite end of said coal tube, a coal feeding worm within said tube extending into said coal compartment and retort, said worm having at one end thereof a shaft extending through said retort and projecting therefrom, an ash conveyor duct having its intake end positioned alongside of the retort and below the level of the retort top, an ash removing worm in said duct, means drivably connecting the intake end of the ash removing worm with the projecting end of said coal worm shaft, means for driving said ash removing worm from its discharge end and means for preventing the movement of coal from said retort along the projecting end of the coal worm shaft, said stoker being characterized by having the coal worm driven from its discharge end by the ash removing worm.

7. A coal stoker having in combination a retort, a coal storage compartment associated with said retort, a coal tube communicating between said compartment and retort, a coal feeding worm within said tube extending into said compartment and having a shaft at the discharge end thereof projecting from said retort, an ash removal duct extending into the ash pit of the furnace and along one side of the retort, an ash worm within said ash duct having a driving connection to the projecting shaft of said coal feeding worm and means for driving said ash worm from the discharge end thereof, said coal and ash worms being substantially parallel in plan view.

8. A stoker of the class described having in combination a coal storage compartment, a retort spaced from said storage compartment, a coal tube communicating between said retort and compartment, a coal conveying worm within said tube having its intake end projecting into said coal containing compartment and having its discharge end projecting through said retort, an ash conveying worm disposed alongside of said coal conveying worm, means for rotating said ash conveying worm from its discharge end and means for drivably connecting the intake end of said ash worm to the discharge end of the coal conveying worm.

9. A stoker comprising a burner adapted to be located in a furnace fire box, a coal feed screw conveyor extending from the lower part of the burner, an ash removal screw conveyor extending from the lower part of the burner in juxtaposition to the coal conveyor, an air conduit extending from the lower part of the burner in juxtaposition to the coal conveyor, the coal conveyor, ash conveyor and air conduit being arranged in parallel adjacent positions for location in the furnace ash pit door opening, a drive unit comprising a blower connected to the air conduit, a drive motor connected to the blower, drive connections between the motor and the discharge end of the ash screw, and a chain and sprocket driving connection between the burner ends of the coal and ash conveyors.

10. In an underfeed stoker for burning coking bituminous coal in a domestic type furnace wherein the burner unit is fed by a motor-driven, substantially horizontal, coal-feeding screw conveyor and wherein the burner unit is of suitable size and proportions for ready installation in such furnace and has a generally circular fire pot communicating at its base with the coal conveyor and extending upwardly therefrom to a crown and then extending downward and outward from the crown, with the fire pot provided with inwardly directed tuyère openings near its crown only, the combination with such fire pot of an ash removing screw conveyor having its entrance end at the burner unit and not substantially below the level of the burner end of the coal conveyor and having its discharge end coupled to the stoker driving motor, and a power transmitting connection between the burner or discharge end of the coal conveyor and the burner or entrance end of the ash conveyor, whereby the coal and ash screw conveyors are driven by the stoker motor with the coal screw conveyor driven from its discharge end from the ash screw conveyor and the coal column between the base of the fire pot and the lowest tuyère openings in the fire pot utilizes a substantial portion, not less than one-half, of the over-all height of the burner unit from the bottom of the lowermost of the two conveyors to the fire pot crown, thereby providing in a domestic underfeed bituminous-burning ash-removing stoker an efficient coking column as well as a conveyor drive in which the conveyor screws of both the coal and ash conveyors are in tension.

11. The combination set forth in claim 10 in which the shaft of the coal screw conveyor extends beyond the base of the fire pot, the ash screw conveyor is substantially horizontal with its axis perpendicular to a plane which is perpendicular to the axis of the coal screw conveyor and with the shaft of the ash screw conveyor extending in advance of the entrance end thereof, and in which the power transmitting connection connects the shaft extensions of the coal and ash screw conveyors and revolves solely in planes perpendicular to the axes of said conveyors.

12. The combination set forth in claim 10 in which the burner unit is surrounded by an annular grate structure positioned below the fire pot crown and through which structure the ashes pass to an annular ash receiver positioned beneath the grate structure, the ash receiver being rotatably mounted upon the burner unit above the level of the coal conveyor and rotated during the operation of the stoker to convey the ash which deposits thereon around to the entrance end of the ash conveyor where the ashes are removed from the ash receiver by a stationary scraper, the axis of the ash conveyor being substantially horizontal and positioned below the level of the ash receiver but not below the level of the coal conveyor axis, whereby the furnace ash pit is ash-free, the burner unit is compact and the coking column is relatively long.

13. The combination set forth in claim 10 in which the ash removing screw conveyor is parallel to, and disposed alongside of the coal screw conveyor and passes out of the furnace through the same opening through which passes the coal screw conveyor, with the power transmitting connection positioned on the side of the burner unit furthest from said furnace opening.

14. In a domestic bituminous burning ash removing underfeed stoker, a substantially horizontal coal conveying screw conveyor; a substantially horizontal ash removing screw conveyor with its axis positioned perpendicular to a plane which is perpendicular to the axis of the coal screw conveyor and also positioned not below the axis of the coal screw conveyor; a burner unit having a generally circular fire pot communicating at its base with the coal conveyor and providing a relatively long coking column, an annular grate structure surrounding the fire pot below its top, and an annular ash receiver positioned beneath the grate structure on a level above the ash removing conveyor and rotatably mounted upon the burner unit to convey and discharge the ashes deposited thereon around to and into the entrance end of the ash removing conveyor; driving means coupled to the discharge end of the ash removing conveyor; and a power transmitting connection between the burner end of the coal feeding conveyor and the burner end of the ash removing conveyor, said connection being positioned so that at least a substantial portion thereof is beneath the ash receiver and thus positioned in an ash-free region and at least partially shielded by the ash receiver from the fire over the grate structure.

15. The apparatus set forth in claim 14 in which the power transmitting connection consists of a chain and cooperating sprockets.

16. The apparatus set forth in claim 14 in which the coal and ash conveyors are parallel and extend from the burner unit in the same direction, with the screw of each conveyor having an extension projecting in the opposite direction beyond the axis of the fire pot, and in which the power transmitting connection consists of sprockets mounted on said conveyor screw projections and of a chain meshing with and coupling said sprockets.

17. A stoker comprising a burner having a fixed pot, an ash receiving structure rotatably mounted around the pot, and means for imparting intermittent rotation to the structure comprising an annular rack carried by the structure, a pawl engaging the rack, a support for the pawl carried by the structure, and means for reciprocating the pawl.

18. A burner for stokers comprising a fire pot, an annular grate surrounding the fire pot, an ash receiver surrounding the fire pot below the grate, means closing off the space between the furnace wall and the ash receiver so as substantially to prevent the passage of air from the furnace ash pit up through such space to the combustion zone and to the underside of the grate, means including bearings for rotatably supporting the receiver on the pot, and an apron on the pot extending over the bearings into juxtaposition to a registering portion of the ash receiver in a zone of ash accumulation to provide an ash air seal at the bearings substantially preventing the passage of air from the furnace ash pit up through the rotatable support for the ash receiver to the underside of the grate.

19. A burner for stokers comprising a fire pot, a rotor frame rotatably mounted around the fire pot and having a shoulder around its outer periphery, an ash table supported upon the rotor frame shoulder and having an upturned lip around its inner periphery, a clamping ring fitting over the upturned lip of the ash table for detachably mounting the ash table on the rotor frame, and ash grates mounted on the clamping ring.

20. A burner for stokers comprising a fire pot, an annular ash receiver surrounding the pot and rotatably mounted thereon, a stationary ash trough having a wall beyond the periphery of the ash receiver and extending upward therefrom and having a floor underlying the ash receiver inward from its periphery and terminating in an upwardly directed lip, and ribs on the underside of the ash receiver overlying the ash trough floor arranged to plow outwardly toward the ash trough wall the ashes collecting between the ash receiver and the ash trough floor, whereby an ash air seal is formed between the rotatable ash receiver and the stationary ash trough and the seal is maintained without loss of ash over the ash trough lip.

21. A burner for stokers comprising a fire pot, an annular ash receiver surrounding the pot and rotatably mounted thereon and having a lip at its periphery extending upwardly from the floor of the ash receiver, and a stationary outer wall having its lower edge positioned radially within the ash receiver lip and below the top edge thereof so as to engage the ashes on the receiver and form an ash air seal between the rotatable ash receiver and the stationary outer wall.

22. The apparatus set forth in claim 21 in which the bottom of the outer wall has ribs formed thereon arranged to plow inwardly ashes which tend to work beneath the bottom of the outer wall toward the ash receiver lip, thereby maintaining the ash air seal without loss of ash over the ash receiver lip.

23. In a stoker, the combination of a burner adapted to be located in the combustion chamber of a furnace and including a stationary fire pot having a central coal passageway, an annular crown at the top of the coal passageway with inwardly and outwardly directed tuyère openings in the crown and having an air chamber surrounding the coal passageway and passing air solely to said tuyère openings, a grate surrounding the fire pot below the outwardly directed tuyère openings in the crown thereof, an ash receiver surrounding the fire pot below the grate and means rotatably supporting the ash receiver upon the fire pot and substantially preventing the passage of air from the furnace ash pit up through the space between the ash receiver and fire pot to the underside of the grate, of a stationary seal plate extending from the walls of such combustion chamber into juxtaposition with said ash receiver and radially within the outer edge of said ash receiver all around the periphery of said ash receiver to form an annular zone where the stationary seal plate and the rotatable ash receiver overlap in spaced relation and where ash collects so that the zone is normally filled with ashes during operation thereby to provide an ash air seal between the stationary seal plate and the rotatable ash receiver to prevent the passage of air from the furnace ash pit up through the area so sealed to the combustion zone and to the underside of the grate.

24. In an underfeed stoker having a coal feeding conveyor, an ash removing conveyor and an air supply system, a burner unit therefor for installation in the furnace ash pit, comprising a retort having an inner wall forming a fire pot communicating at its base with the coal feeding conveyor and extending upwardly to a crown and then extending outward and downward from the crown, with said wall having inwardly and outwardly directed tuyère openings therein near the crown and with the retort having an outer wall forming an air chamber between the inner and outer walls communicating at its base with the air supply system and communicating at its top with the tuyère openings, an ash sifting grate structure positioned below the fire pot crown around the periphery of the burner unit, and means forming a substantially air tight enclosure beneath the grate structure for receiving the ashes sifting through the grate structure and conveying such ashes to and discharging them into the ash removing conveyor and for substantially preventing the passage of air from the furnace ash pit through the grate structure to the fuel thereabove, said means including an ash table rotatably supported upon the burner unit, an inner ash air seal between the ash table and burner unit independent of the rotatable support for the ash table, a stationary outer wall and an outer ash air seal between the ash table and the outer wall.

25. The apparatus as set forth in claim 24 in which the stationary outer wall is supported upon the burner unit and has a scraper blade extending over the ash table to remove the ashes therefrom as the ash table rotates, said apparatus also including a conduit adjacent said blade and supported upon the burner unit for guiding the ashes to the ash removing conveyor.

26. The apparatus set forth in claim 24 in which a dead plate closing the space between the outer periphery of the grate structure and the furnace walls substantially prevents the passage of air from the furnace ash pit around the burner unit to the combustion zone, the said means and dead plate thereby causing a large proportion of the air necessary for the combustion to be passed through the tuyère openings.

27. In an underfeed stoker, the combination with a burner in which the fire pot is surrounded by an enclosed air chamber with tuyère openings therein for feeding air to the fuel at the top of said fire pot, an ash table surrounding said fire pot below the top thereof, an ash removing conveyor and means for conveying the ashes upon said ash table to, and discharging them into, said ash removing conveyor, a grate structure surrounding said fire pot above said ash table and onto which the contents of said fire pot are adapted to discharge whereby the completely burned fuel (ash) in said contents sifts down through the openings in said grate structure and the incompletely burned fuel in said contents burns to substantial completion over said grate structure and then sifts down therethrough, a substantially air-tight enclosure for said ash table extending up to the under side of said grate structure, a blower the output of which is connected by an air pipe to said air chamber and an auxiliary air pipe communicating with the output of said blower and discharging into said enclosure, whereby air for burning the fuel over said grate structure is supplied from below the grate structure.

28. A stoker as set forth in claim 27 in which the air pipe to said air chamber contains a permanent opening for the supply of air to the fuel over the grate structure under the natural draft of the furnace during banking periods.

29. A stoker having an air tube, a coal screw conveyor and an ash screw conveyor all extending from the same side of the furnace parallel to each other and in the sequence named so that the coal screw conveyor is between the other two and extends substantially further from the furnace than the other two, a driving motor having its drive shaft extending from each end of the motor, said motor being positioned above the coal screw conveyor with the axis of rotation of its drive shaft substantially horizontal and transverse to the axis of the coal screw conveyor, a blower having its rotating element rotating in vertical planes substantially parallel to the coal tube, having its rotating element coupled to the air tube end of the motor drive shaft and having the discharge of the blower connected to the air tube, speed reducing mechanism positioned at the other end of the motor drive shaft with the input of the mechanism coupled to such other end of the motor drive shaft and with its output coupled to the screw shaft of the ash screw conveyor, said ash screw conveyor stopping short of the speed reducing mechanism and having an axial extension of its screw shaft to which the speed reducing mechanism is coupled, and driving connections between the burner ends of the ash and coal screw conveyors through which the coal screw conveyor is driven.

WILLIAM M. SCHWEICKART.
FRED G. JULYAN.